United States Patent
Rudelle et al.

[11] Patent Number: 6,166,921
[45] Date of Patent: Dec. 26, 2000

[54] SEMICONDUCTOR DEVICE INCLUDING AN INTEGRATED CIRCUIT FOR REALIZING A DC VOLTAGE CONVERTER

[75] Inventors: Marie-Irène Rudelle, Caen; Patrick Jean, Vaux sur Seulles, both of France

[73] Assignee: U.S. Philips Corporation, New York, N.Y.

[21] Appl. No.: 09/415,130

[22] Filed: Oct. 8, 1999

[30] Foreign Application Priority Data

Oct. 13, 1998 [FR] France .................................. 98 12819

[51] Int. Cl.$^7$ ............................. H02M 3/335; G05F 1/40
[52] U.S. Cl. .............................. 363/16; 363/17; 323/282
[58] Field of Search ............................. 363/16, 17, 65, 363/72, 78; 323/283, 282

[56] References Cited

U.S. PATENT DOCUMENTS

| | | | |
|---|---|---|---|
| 4,016,475 | 4/1977 | Makino | 363/22 |
| 4,519,023 | 5/1985 | Lester | 363/22 |
| 4,897,774 | 1/1990 | Bingham et al. | 363/61 |
| 5,237,209 | 8/1993 | Brewer | 307/110 |
| 5,306,954 | 4/1994 | Chan et al. | 307/110 |

FOREIGN PATENT DOCUMENTS

0176823A1  4/1986  European Pat. Off. ......... H02M 7/10

*Primary Examiner*—Peter S. Wong
*Assistant Examiner*—Rajnikant B. Patel
*Attorney, Agent, or Firm*—Dicran Halajian

[57] ABSTRACT

An integrated circuit includes a converter for converting a first DC voltage from a DC voltage source to an AC signal. The converter include an inductor and a transistor. The inductor and an intrinsic capacitance of the transistor provide an oscillating circuit without a need for a transformer. The integrated circuit also includes a rectifier for rectifying the AC signal to form a second DC voltage which has a sign opposite to the sign of the first DC voltage.

20 Claims, 1 Drawing Sheet

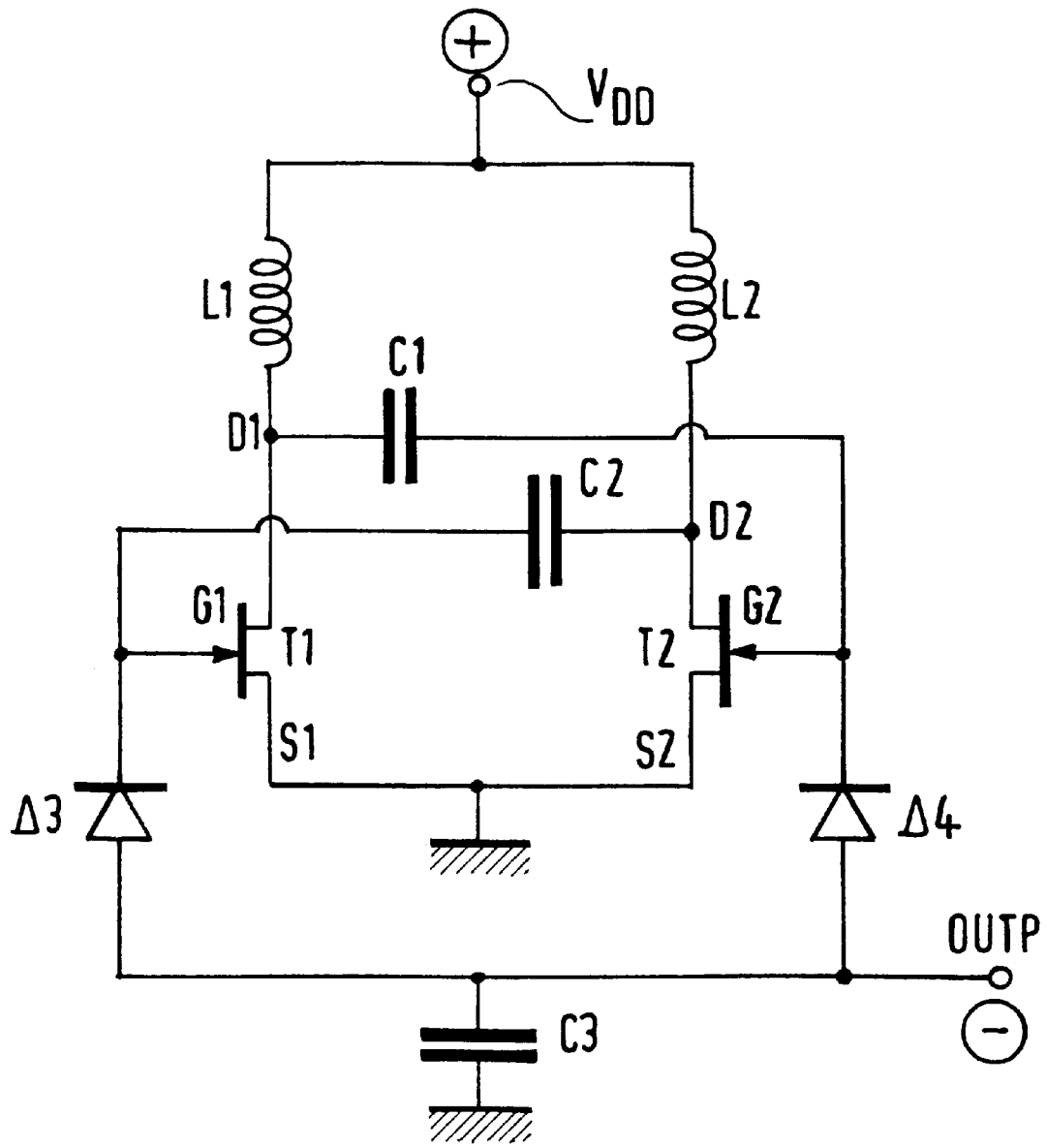

SEMICONDUCTOR DEVICE INCLUDING AN INTEGRATED CIRCUIT FOR REALIZING A DC VOLTAGE CONVERTER

FIELD OF THE INVENTION

The invention relates to a semiconductor device including an integrated circuit for realizing a DC voltage converter.

The invention finds its application in the manufacturing industry of semiconductor devices including integrated circuits used in mobile and wireless telephones and, generally, in portable appliances.

For portable appliances in general, the supply of electric power is provided by batteries in the form of a positive DC voltage. These portable appliances may comprise a telephone transmission function (transmission/reception) and many other functions. A number of these functions is ensured by the use of integrated circuits that very often require, on the one hand, a positive DC bias voltage delivered by the DC voltage of the batteries and, on the other hand, by a negative bias voltage that is to be generated.

BACKGROUND OF THE INVENTION

A generator of various DC voltages has already been known from patent application EP 0 176 823. This document describes a diode rectifier circuit applied to an AC voltage produced by the secondary winding of a transformer whose primary winding is connected to the standard distribution network.

For supplying two opposite-sign DC voltages of which one has a different value from the other, the circuit either comprises two AC voltages coming from two secondary windings of the transformer and a single rectifier formed by four diodes and two capacitors plus coupling capacitors, or the circuit comprises a single AC voltage coming from a single secondary winding and two rectifier circuits arranged in series or in parallel, for which eight diodes and four capacitors are necessary, excluding extra capacitors.

This device is not entirely integrable; it needs to have a connection to the AC network and the use of a cumbersome transformer and, furthermore, the circuit itself will comprise an increased number of components if the dimension of the transformer is reduced.

SUMMARY OF THE INVENTION

It is an object of the present invention to provide a semiconductor device including a completely integrated circuit suitable for producing a negative DC voltage based on the supply of positive DC power by standard cells or batteries.

This and other objects are achieved by a semiconductor device including an integrated circuit that has a first DC bias voltage, for realizing a DC voltage converter. The integrated circuit comprises circuit elements that have a function of oscillator for generating an AC signal based on the first DC bias voltage, and circuit elements that have a function of rectifier for generating, based on the rectified AC signal, a second DC bias voltage of opposite sign to that of the first bias voltage. The circuit elements having the functions of oscillator and rectifier are interdependent.

The advantage of this device is that it is completely integrable in microwave integrated circuit technology currently used in the portable and wireless telephones of the MMIC type (Monolithic Microwave Integrated Circuits) and other portable appliances. Up till now this has not been the case with known DC voltage converter devices that were exterior to the integrated semiconductor device. The various DC voltages necessary for the functioning of the MMIC circuits were generated outside the MMICs.

Another advantage of this device is not only that it is integrable with the substrate of the MMICs, but also that it generates a negative DC voltage based on the positive bias voltage of the MMICs themselves. The result is that this device is simply supplied with power at the same time as the MMICs by the standard cell or battery of the portable appliances that include these MMICs.

In a general manner, the invention finds its application in any integrated circuit that has stages supplied with power both by a negative voltage and a positive voltage.

BRIEF DESCRIPTION OF THE DRAWINGS

These and other aspects of the invention are apparent from and will be elucidated, by way of non-limiting example, with reference to the embodiment(s) described hereinafter.

In the drawing:

FIG. 1 represents the diagram of the DC voltage converter circuit.

DESCRIPTION OF THE PREFERRED EMBODIMENT

The DC voltage converter circuit comprises means formed by an integrated circuit, for converting the positive DC voltage produced by a standard cell or battery available on a terminal denoted VDD into a negative DC voltage available on a terminal denoted OUTP.

The positive DC voltage is used for realizing the positive bias voltage of an integrated circuit preferably on the same substrate as the DC voltage converter circuit. The negative DC voltage that is generated on the terminal OUTP is used for realizing a negative bias voltage of this integrated circuit. Actually, when an integrated circuit is realized by means of field effect transistors, the drain bias of the transistors often necessitates a positive DC voltage and the gate bias a negative DC voltage.

This DC voltage converter circuit is formed by line elements, capacitors, diodes and field effect transistors all compatible with the technology of the microwave circuits that can be monolithically integrated on a substrate. Nowadays, these circuits, denoted MMCs, are favorably deposited on a semi-insulating substrate of gallium arsenide on which a stack of layers of material of the chemical group III–V is realized in which the elements of the circuit are deposited in steps including, for example, a photolithography technique. These MMICs operate in the microwave frequency domain for applications to telecommunications such as cited above. These circuits are extremely compact and favorable to insert into a portable transmission device.

The DC voltage converter circuit represented in FIG. 1 first includes two self-inductances L1 and L2 having the same values, connected by one of their ends to the terminal $V_{DD}$ of positive DC power supply and by their other ends to nodes denoted D1 and D2, respectively.

The circuit of FIG. 1 then includes two field effect transistors denoted T1 and T2. The drain D1 of the transistor T1 forms the node D1 for connection to the self-inductance L1. The drain D2 of the transistor T2 forms the node D2 for connection to the self-inductance L2. The sources S1 and S2 of the respective transistors T1 and T2 are connected to each other and to ground.

The gate G1 of the transistor T1 is connected via a capacitor C2 to the drain D2 of the transistor T2. The gate G2 of the transistor T2 is connected via a capacitor C1 to the drain D1 of the transistor T1. The capacitors C1 and C2 have no other function but being DC isolation capacitors.

The output terminal of the circuit denoted OUTP is connected, on the one hand, to ground via a DC isolation capacitor C3 and, on the other hand, to each one of the respective gates G1 and G2 via diodes denoted Δ3 and Δ4, respectively.

The circuit described above forms both an oscillator and a rectifier. Each of the circuit elements having the function of oscillator or rectifier uses intrinsic elements, intrinsic capacitors or diodes of the field effect transistors T1 and T2, and thus the circuit cannot be separated into a circuit portion having purely a function of oscillator and a circuit portion having purely a function of rectifier. These portions are interdependent.

It should be observed that the circuit portion having the function of oscillator does not have the task of generating an AC signal at a frequency that would be predetermined with a specific object. It is sufficient for the circuit to generate a high-frequency AC signal.

The circuit portion having the function of oscillator comprises the association of the self-inductances L1 and L2 and the intrinsic gate-source capacitances denoted $C_{GS1}$, $C_{GS2}$ of the respective transistors T1, T2. The values chosen for the self-inductances L1 and L2 are tuned to the values of the intrinsic capacitances $C_{GS2}$, $C_{GS1}$ which depend on the choice of the respective transistors T2 and T1. As these intrinsic capacitances $C_{GS1}$ and $C_{GS2}$ are small, the frequency obtained for the AC signal is high. As stated above, the coupling capacitors C1 and C2 have no influence on the oscillation frequency.

For realizing the circuit portion having the function of oscillator, intrinsic properties of the field effect transistors T1 and T2 are benefited from.

The transistors T1 and T2 associated to the self-inductances L1 and L2 form two amplifiers which are connected so that, alternately, the input G1 of the first transistor T1 is connected to the output D2 of the second transistor T2, and the input G2 of the second transistor T2 is connected to the output D1 of the first transistor T1.

In these conditions, the noise of the circuit that is amplified creates the instability that is sufficient for the circuit to perform the function of oscillator. The AC voltage generated in this part of the circuit is superimposed on the DC voltage $V_{DD}$.

The DC voltage converter circuit further includes a circuit portion having the function of rectifier. For performing the function of rectifier, the diode Δ3 associated to the intrinsic diode of the transistor T1 rectifies a first alternation of the AC signal, and the diode Δ4 associated to the intrinsic diode of the transistor T2 rectifies a second alternation of the AC signal. Indeed, in this circuit a positive alternation of the AC signal occurs at one instant in the branch Δ3, T1, and a half-period later, another positive alternation occurs in the branch Δ4, T2.

Thus, as the oscillator is a differential mode oscillator, the first positive alternation that occurs is rectified by the diode Δ3 and the transistor T1 arranged in the left branch of the circuit shown in FIG. 1, and a half-period later, the second positive alternation that occurs is rectified by the diode Δ4 and the transistor T2 in the right branch of the circuit shown in FIG. 1. The branches Δ3, T1 and Δ4, T2 operate in turns.

This circuit thus forms the association of two half-wave rectifiers that have parallel associated outputs, applied to anti-phase input signals.

This circuit thus enables to obtain on the terminal OUTP a negative DC voltage having a value denoted Vourp versus the DC signal having a value denoted $V_{DD}$ available on the terminal $V_{DD}$, so that:

$V_{OUTP} \approx -2V_{DD}$

Generally, $V_{DD}$ is of the order of:

$V_{DD}$=3V, which is a standard battery voltage from which results that:

$V_{OUTP}$=−6V

This signal $V_{OUTP}$ is favorably used for biasing the gates of the field effect transistors used in MMICs incorporated in semiconductor devices and included in portable appliances.

If very little power consumption is desired, this circuit may also be realized with transistors having less power which produce a smaller amplification so that for:

$V_{DD}$=3V the result is that $V_{OUTP}$=−3V.

Thus, as a function of the power of the transistors, which have intrinsic elements to which are connected the drain self-inductances L1 and L2, those skilled in the art will easily be able to obtain a predetermined given value $V_{OUTP}$ as a function of $V_{DD}$.

Such a DC voltage converter circuit included in a semiconductor device is favorably used in a portable appliance supplied with power by a cell or a battery.

Such a DC voltage converter circuit included in a semiconductor device is favorably used, for example, in a portable appliance such as a mobile telephone supplied with power by a cell or a battery.

Such a DC voltage converter circuit included in a semiconductor device is favorably used, for example, in a portable appliance such as a wireless telephone type supplied with power by a cell or a battery.

Such a dc voltage converter circuit included in a semiconductor device is favorably used, for example, in a portable appliance such as a calculator with a processor for carrying out personal computer functions, for example, with telecommunication data transfer, supplied with power by a cell or a battery.

What is claimed is:

1. An integrated circuit comprising: field effect transistors each having a gate, a drain and a source; wherein each said drain is connected to a first DC bias voltage through a respective inductance to form an oscillator for generating an AC signal based on said first DC bias voltage; wherein each said gate is connected to an output of said integrated circuit through a respective diode to form a rectifier for forming a rectified AC signal from said AC signal and for generating, based on the rectified AC signal, a second DC bias voltage of opposite sign to the first bias voltage;

wherein said field effect transistors, said respective inductances and said respective diodes for forming said oscillator and said rectifier are interdependent.

2. The integrated circuit of claim 1 wherein the field effect transistors are amplifier stages arranged in differential manner with said respective sources connected to ground, and wherein said respective diodes form half-wave rectifier stages arranged in parallel, each of said respective diodes rectifying alternations of anti-phase of said AC signal.

3. The integrated circuit of claim 1, wherein each said respective inductance is tuned to a gate-source capacitance of a corresponding one of said field effect transistors, wherein the drain of one of said field effect transistor is connected to the gate of another of said field effect transistors for producing said AC signal.

4. The integrated circuit of claim 1, wherein said respective diode is arranged between ground and the gate of one of the field effect transistors and is associated to intrinsic diode of said one field effect transistor for rectifying each half cycle in alternation of the AC signal generated.

5. The integrated circuit of claim 1, wherein said field effect transistors are monolithically integrated on a substrate.

6. The integrated circuit of claim 5, wherein the substrate is a semi-insulating material of group III–V, and the field effect transistors are integrated in a stack of layers of a material III–V realized on said substrate.

7. A portable appliance supplied with power by a battery and incorporating at least one integrated circuit as claimed in claim 1.

8. A mobile telephone supplied with power by a battery and incorporating at least one integrated circuit as claimed claim 1.

9. A wireless telephone supplied with power by a battery and incorporating at least one integrated circuit as claimed in claim 1.

10. A calculator having a processor for executing personal computer functions with telecommunication data transfer, supplied with power by a battery and incorporating at least one integrated circuit as claimed in claim 1.

11. An integrated circuit comprising:
a transistor having an input and a transistor output;
an inductor connected between said transistor output and a DC voltage source which provides a first DC voltage; said inductor providing an AC signal in conjunction with and an intrinsic capacitance of said transistor; said AC signal being superimposed on said first DC voltage;
a diode connected between said transistor output and a device output of said integrated circuit; said diode rectifying said AC signal to form a second DC voltage.

12. The integrated circuit of claim 11, wherein the first transistor and the second transistor are field effect transistors.

13. An integrated circuit comprising:
a converter for converting a first DC voltage from a DC voltage source to an AC signal; said converter including an inductor and a transistor, wherein said inductor and an intrinsic capacitance of said transistor provide an oscillating circuit without a need for a transformer; and
a rectifier for rectifying said AC signal to form a second DC voltage.

14. The integrated circuit of claim 13, wherein the converter includes two transistors configured to form a differential mode oscillator.

15. The integrated circuit of claim 14, wherein the two transistors are field effect transistors.

16. The integrated circuit of claim 13, wherein the rectifier includes two transistors and two diodes, one of said two diodes being connected to a first input of one of said two transistors, and another of said two diodes being connected to a second input of another of said two transistors.

17. The integrated circuit of claim 16, wherein the two diodes are configured to form two half-wave rectifiers having parallel outputs.

18. The integrated circuit of claim 13, wherein the rectifier includes two transistors and two diodes, said two diodes being configured to form two half-wave rectifiers to form said second DC voltage, wherein said second DC voltage has a sign which is opposite a sign of said first DC voltage.

19. The integrated circuit of claim 13, wherein said converter and said rectifier are interdependent and include two transistors; said rectifier including two diodes connected between transistor outputs of said two transistors to receive said AC signal and a device output of said integrated circuit to provide said second DC voltage.

20. The integrated circuit of claim 13, wherein said second DC voltage has a sign which is opposite a sign of said first DC voltage.

* * * * *